(12) United States Patent
Ding (10) Patent No.: US 8,144,997 B1
(45) Date of Patent: Mar. 27, 2012

(54) METHOD FOR ENHANCED IMAGE DECODING

(75) Inventor: Ke Ding, Shanghai (CN)

(73) Assignee: Marvell International Ltd. (BM)

( * ) Notice: Subject to any disclaimer, the term of this patent is extended or adjusted under 35 U.S.C. 154(b) by 1138 days.

(21) Appl. No.: 11/949,544

(22) Filed: Dec. 3, 2007

Related U.S. Application Data (60) Provisional application No. 60/871,309, filed on Dec. 21, 2006.

(51) Int. Cl.
G06K 9/36 (2006.01)
H04N 7/12 (2006.01)
(52) U.S. Cl. .................. 382/232; 382/284; 375/240.13; 375/240.16
(58) Field of Classification Search .................. 382/518, 382/2.1, 1.9, 3.21, 3.01, 1.13, 520; 341/50, 341/51, 60; 375/2–167
See application file for complete search history.

(56) References Cited

U.S. PATENT DOCUMENTS

| | | | | |
|---|---|---|---|---|
| 5,764,305 A * | 6/1998 | Kondo | ........................... | 348/571 |
| 5,764,805 A * | 6/1998 | Martucci et al. | ............. | 382/238 |
| 6,415,063 B1 * | 7/2002 | Pourjavid | ..................... | 382/275 |
| 6,529,238 B1 * | 3/2003 | Mahant-Shetti et al. | ..... | 348/246 |
| 6,731,806 B1 * | 5/2004 | Gindele | ......................... | 382/205 |
| 6,873,741 B2 * | 3/2005 | Li | ................................ | 382/266 |
| 6,931,534 B1 * | 8/2005 | Jandel et al. | .................. | 713/176 |
| 7,451,237 B2 * | 11/2008 | Takekawa et al. | ............ | 709/247 |
| 7,653,133 B2 * | 1/2010 | Woods et al. | ............. | 375/240.13 |
| 7,711,203 B2 * | 5/2010 | Wan | ............................... | 382/260 |
| 7,734,714 B2 * | 6/2010 | Rogers | .......................... | 709/215 |
| 7,876,833 B2 * | 1/2011 | Segall et al. | ............. | 375/240.24 |
| 2008/0069469 A1 * | 3/2008 | Yan et al. | ....................... | 382/261 |
| 2008/0165850 A1 * | 7/2008 | Sagetong et al. | ........ | 375/240.15 |
| 2009/0244331 A1 * | 10/2009 | Suzuki et al. | .................. | 348/243 |

OTHER PUBLICATIONS

Thang et al, "Spatial Scalability of Multiple ROIs in Surveillance Video", Joint Video Team (JVT) of ISO/IEC MPEG & ITU-T VCEG (ISO/IEC JTC1/SC29/WG11 and ITU-T SG16 Q.6) 5th Meeting: Busan, KR, Apr. 16-22, 2005.*
Bae et al, "Multiple Region-of-Interest Support in Scalable Video Coding", ETRI Journal, Volumen 28, No. 2, Apr. 2006.*
Van Leuven S., Van Schevensteen K., Dams T., and Schelkens P., "An Implementation of Multiple Region-of-Interest Models in H.264/AVC", Signal Processing for Image Enhancement and Multimedia Processing, from Multimedia Systems and Application Series, pp. 215-225, 2006.*

* cited by examiner

*Primary Examiner* — Andrae S Allison (57) ABSTRACT

A method of processing an image includes the steps of receiving selection of the first region of interest (ROI) of an image, processing the first image data related to the first ROI, displaying the first image ROI based on the first image data, receiving selection of the second ROI of the image, which at least partially overlapping the first ROI, processing the second image data related to a portion of the second ROI that does not overlap the first ROI, combining the processed second image data with the processed first image data that overlaps the second ROI, and displaying the second image ROI based on the combined processed second image data and the processed first data.

13 Claims, 12 Drawing Sheets

METHOD FOR ENHANCED IMAGE DECODING

CROSS-REFERENCE TO RELATED APPLICATIONS

This application claims priority under 35 U.S.C. §119(e) to provisional U.S. Patent Application No. 60/871,309, filed on Dec. 21, 2006, the disclosure of which is expressly incorporated by reference herein in its entirety.

BACKGROUND

1. Field of the Invention

The invention is directed to image signal processing, and more particularly to an enhanced JPEG decoder to support decoding in a region of interest together with other capabilities.

2. Related Art

Usage of devices for displaying digital pictures has increased with the increase in the use of digital pictures. For example, information technology has advanced the transmission of information, such as speech, audio, image and video, using wireless or wired channels. This enables multimedia to be transmitted for various applications such as a personal mobile phone or the Internet. Similarly, the use of digital picture cameras has increased the usage of digital pictures. However, it is often difficult to store a large amount of multimedia information. Consequently, the multimedia information must be compressed for transmission and storage. The JPEG standard is one such compression protocol.

In the coding process of a JPEG image, an image frame is partitioned into a number of 8×8 pixel blocks referred to herein as minimum coding unit (MCU) tiles and a discrete cosine transformation (OCT) is calculated for each MCU tile to obtain OCT coefficients. The OCT coefficients are quantized, and then processed through run length coding and entropy coding to create an encoded bit-stream. One property of the OCT is an energy compaction effect which causes the transformed coefficients to be displayed from the low-frequency components at the left-upper region to the high-frequency components at the right-lower region of an 8×8 pixel block. From this property, the statistic characteristics of low-frequency or high-frequency components can be investigated to determine and generate a region of interest (ROI) during a compression process according to the bit-rate requirement.

As compared to JPEG, the JPEG 2000 protocol includes additional features such as a high compression rate, an embedded bit stream, multiple resolution representation, lossy and lossless compression, ROI, and error resilience. The ROI enhances the picture quality at the interested region during the lossy compression for transmission at a limited bandwidth. The compression standard of the JPEG 2000 protocol currently has six parts where part one builds a basic compression standard, and part two through part six are expanded from part one. In the JPEG 2000 protocol, an image frame goes through a discrete wavelet transform (DWT) and its transformed coefficients are then quantized. The transformed coefficients after quantization are partitioned into N×N-pixel codeblocks where each codeblock is processed using bit-plane coding. With a bit-plane as the coding unit, a codeblock is processed by embedded block coding with optimized truncation (EBCOT), including pass coding and arithmetic coding, bit-plane by bit-plane, to yield a high-efficiency embedded bit stream.

The coding process of JPEG 2000 comprises the three steps of:

1. Pre-processing an image frame, including tile dividing and color transforming, where the size for tile dividing is determined by the system requirement and each tile divided from an image frame is used for color transform;
2. Providing a block after the color transform for processing the DWT to remove the spatial redundancy and quantizing the transformed coefficients; and
3. Coding the transformed coefficients after quantization by bit-plane by the EBCOT to eliminate the bit redundancy and to generate an output bit stream based on the packed unit.

The JPEG 2000 in part one provides an option with ROI coding that sacrifices image quality of the uninterested region to improve image quality of the interested region (ROI). In the JPEG 2000 coding process, the ROI is first coded to yield a bit stream and has good visual quality at a limited bandwidth. Accordingly, the ROI coding is useful in applications associated with internet and wireless communications. The picture content of an image frame can be partitioned into the interested and uninterested regions in the ROI applications. The position of the ROI needs to be embedded in the coding bit stream so that the decoder can extract the ROI with good visual quality. To facilitate this, the JPEG 2000 protocol in part one includes the maxshift coding scheme to embed the information of the ROI. Therefore, the JPEG 2000, does not need additional bits to store the position of the ROI, and its decoder can effectively decode the bit stream to obtain good visual quality at the ROI.

However, processing of images using the JPEG or JPEG 2000 protocol may be slow. Decompressing an entire image in a JPEG protocol can be time consuming. Moreover when manipulating an image, such as by moving, rotating or zooming an image, a new ROI needs to be determined, thereby increasing processing. Accordingly, there is a need for improved image manipulation processing.

SUMMARY

The invention provides improved processing of compressed images in response to one or more requests to move, rotate or zoom the image. Further, the invention provides faster processing and display of images when the region of interest of the image is changed.

Accordingly, in one aspect of the invention, a method of processing an image includes the steps of receiving selection of the first region of interest (ROI) of an image, processing the first image data related to the first ROI, displaying the first image ROI based on the first image data, receiving selection of the second ROI of the image, the second ROI at least partially overlapping the first ROI, processing the second image data related to a portion of the second ROI that does not overlap the first ROI, combining the processed second image data with the processed first mage data that overlaps the second ROI, and displaying the second image ROI based on the combined processed second image data and the processed first data.

The first and second image data may comprise JPEG format data, and the steps of processing the first image data and the second image data may include decoding the first and second image data. The image may be a thumbnail image. The step of processing the first image data may further include the steps of applying a low-pass filter to the first image data, performing down sampling of the first image data, and performing bilinear resizing of the first image data. The step of applying the low-pass filter further may include steps of calculating a cutting frequency from a resizing factor of the first image data, and setting a target coefficient to zero. The first image data may be divided into data blocks, and the step of down sampling may be performed for each data block independently by a factor of ½, ¼ and ⅛. The first image data may be in JPEG format, and the data blocks may include a minimum coding unit. The step of performing bilinear resizing may include performing bilinear interpolation. The method may further include a step of padding delta regions of the second ROI to maintain a source integer pixel position unchanged by boundaries between minimum coding unit tiles. The step of padding may include the steps of calculating the source integer pixel position from the image, and determining x offset and y offset based on proximity to a source integer pixel position.

According to another aspect of the invention, a machine-readable medium including instructions, which, when executed by at least one image decoding processor cause the processor to decode an image, includes instructions for receiving selection of the first region of interest (ROI) of an image, instructions for processing first image data related to the first ROI, instructions for displaying the first image ROI based on the first image data, instructions for receiving selection of the second ROI of the image, the second ROI at least partially overlapping the first ROI, instructions for processing second image data related to a portion of the second ROI that does not overlap the first ROI, instructions for combining the processed second image data with the processed first image data that overlaps the second ROI, and instructions for displaying the second image ROI based on the combined processed second image data and the processed first image data.

The first and second image data may include PEG format data. The instructions for processing the first image data and the second image data may include instructions for decoding the first and second image data. The instruction for processing the first image data may include instructions for applying a low-pass filter to the first image data, instructions for performing down sampling of the first image data and instructions for performing bilinear resizing of the first image data. The instruction for applying the low-pass filter may include instructions for calculating a cutting frequency from a resizing factor of the first image data, and instructions for setting a target coefficient to zero. The first image data may be divided into data blocks, and the instructions for down sampling may be performed for each data block independently by a factor of ½, ¼ and ⅛. The first image data may be in JPEG format and the data blocks may include a minimum coding unit. The instructions for performing bilinear resizing may include performing bilinear interpolation. The image may be a thumbnail image. The instructions may further include instructions for padding delta regions of the second ROI to maintain a source integer pixel position unchanged by boundaries between minimum coding unit tiles. The instructions for padding may include instructions for calculating the source integer pixel position from the image, and instructions for determining x offset and y offset based on proximity to a source integer pixel position.

In yet another aspect of the invention, a method of processing an image includes the steps of receiving selection of a region of interest (ROI) of an image to define an ROI image, processing the first image data related to the ROI, rotating the ROI, which include steps of accessing a source minimum coding unit (MCU) index for each destination MCU of the image according to a rotation pattern, modifying image data in an MCU according to the rotation pattern and writing the modified image data to an image data stream, and displaying the ROI image.

The step of processing may further include building a Huffman index tree from an input image data stream. The image data may include JPEG format data. The method may further include the step of cropping the ROI image into a MCU boundary. The image may be a thumbnail image.

In yet another aspect of the invention, a machine-readable medium including instructions, which, when executed by at least one image decoding processor cause the processor to process an image, includes instructions for receiving selection of a region of interest (ROI) of an image to define an ROI image, instructions for processing the first image data related to the ROI, instructions for rotating the ROI, which includes accessing a source minimum coding unit (MCU) index for each destination MCU of the image according to a rotation pattern, modifying image data in an MCU according to the rotation pattern, and writing the modified image data to an image data stream, and instructions for displaying the ROI image.

The instructions for processing may further include building a Huffman index tree from an input image data stream. The image data may be in JPEG format. The instructions may further include instructions for cropping the ROI image into a MCU boundary. The image may be a thumbnail image.

Additional features, advantages, and embodiments of the invention may be set forth or apparent from consideration of the following detailed description, drawings, and claims. Moreover, it is understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to illustrate structural details of the invention in more detail than may be necessary for a fundamental understanding of the invention and the various ways in which it may be practiced. In the drawings.

DETAILED DESCRIPTION

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

The invention provides an enhanced decoding scheme, such as ROI (region of interest) decoding for JPEG images. A decoder application of the invention may provide a unified application programming interface (API) and configuration parameter to execute various functions such as JPEG decoding, generating thumbnail images, rotating, moving and zooming in/out images, decoding ROI and the like. These functions may be useful in handheld devices, for example, such as Monahans LV™ processor based handheld devices and the like, running on operating systems for such devices. Examples of such operating systems include Microsoft Windows™ Mobile 5.0 for PocketPC™, EABI Linux™ or a Nucleus™ operating system used in a handheld device and so on.

Figure 1:
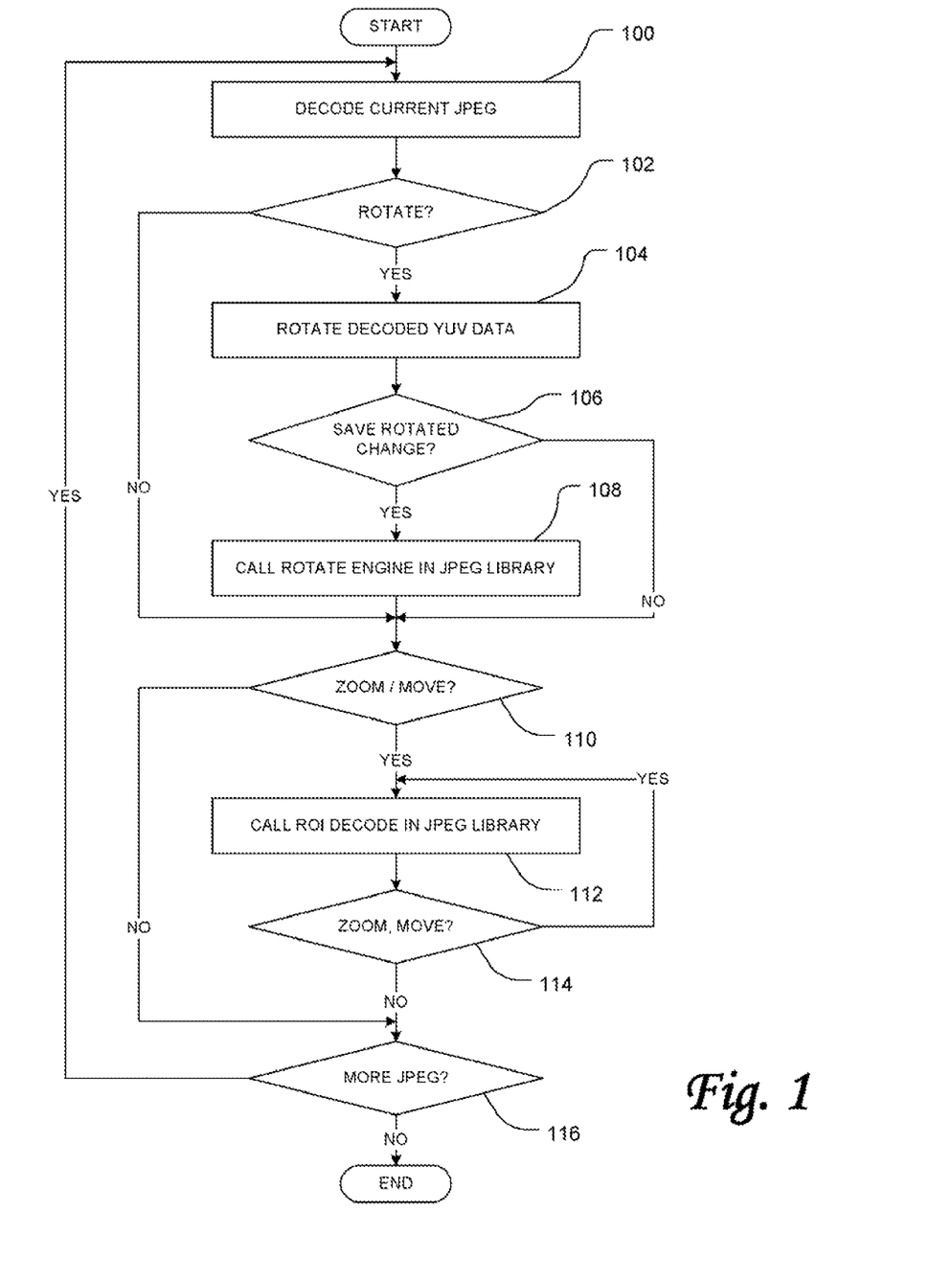
FIG. 1 illustrates a flow chart of a method for using a decoder application from a usage standpoint operating according to principles of the invention.

In particular, FIG. 1 illustrates a flow chart for an image processing process of a decoder application from a usage standpoint. Specifically, the flow chart illustrates an example of the steps taken by a decoder application to process a JPEG image in response to one or more user selections. Once a user starts the decoder application and selects a JPEG image to be processed, the selected JPEG image may be decoded at step 100. The user may select to rotate, zoom or move the image. If the user selects to rotate the image at step 102, the decoder application processes the image to rotate the YUV data of the decoded image at step 104 and may display the rotated image. If the user selects to save the rotation of the image at step 106, the decoder application calls a rotate engine application from an application library at step 108. Upon completing step 108, if the user does not select to rotate the image at step 102 or to save the rotated change at step 106, the user may select to zoom or move the image at step 110. If the user selects move or zoom, the decoder application calls a ROI decode routine or algorithm from a JPEG library at step 112. If the user further selects to zoom or move the image at step 114 (e.g., move the image after zooming), step 112 may be repeated. When the user no longer selects zoom or move the image at step 114 or the user selects not to zoom or move the image at step 110, the image processing for that image is completed. If the user selects to process another image at step 116, the image processing process may start over again from step 100. Otherwise, the image processing process may be terminated.

Figure 2:
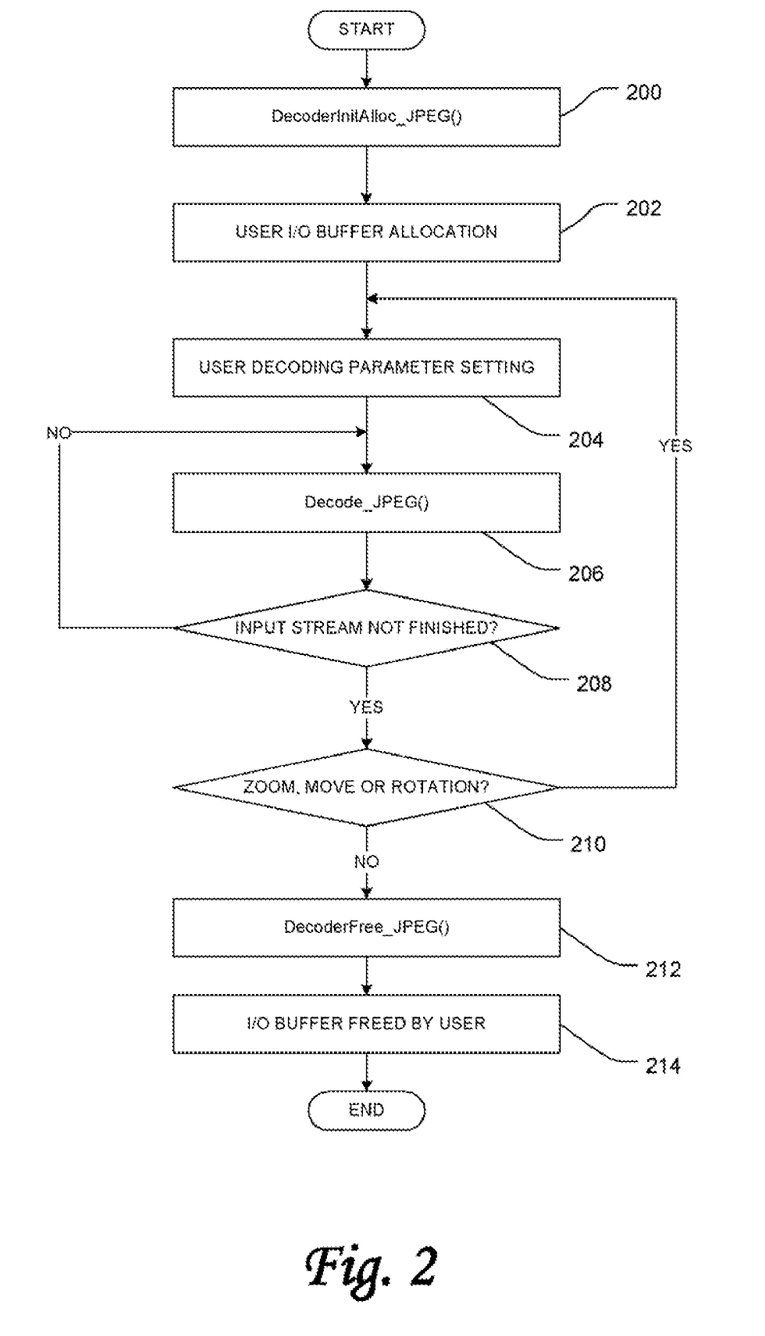
FIG. 2 illustrates a flow chart of a method for using a decoder application from a codec standpoint operating according to principles of the invention.

In particular, FIG. 2 illustrates a flow chart for the image processing process from a codec standpoint. Specifically, this flow chart illustrates an example of pulling and executing routines in a library in response to one or more user selections for manipulating an image. At step 200, the decoder initiates an input/output (I/O) buffer allocation for a JPEG image, such as in the form of a "DecoderInitAlloc_JPEG( )" routine. This allocation routine may be provided from a library and initializes the device for decoding one or more JPEG images. The initialization may include allocating space in a buffer for image data.

At step 202, space may be allocated in the buffer based on user selections. At step 204, the decoder application parameters are set based on the users' selection. At step 206, the JPEG information may be decoded. The decoding routine may be provided from a JPEG library, such as in the form of a "Decode_JPEG( )" routine. The JPEG information may be decoded using known techniques for JPEG data decoding.

At step 208, a determination is made if the input stream is decoded. If the input stream is decoded, the user may select to manipulate the image, such as to zoom, move or rotate, at step 210. The process may be redirected to set the user decoding parameter at step 204. Decoding parameters may be set by a user when selecting what portions of an image to display and how the image should be displayed. Thus, decoding parameters may change when a user rotates an image, or zooms in on a specified area of an image.

If the input stream is not decoded at step 208 (partial JPEG decoding), the process may be directed to perform decoding at step 206. If the user does not select to zoom, move or rotate the image at step 210, the viewer ends the JPEG initiation. A routine (e.g. "DecoderFree_JPEG( )") to end the image processing is executed at step 214, such as from a routine from the JPEG library. The I/O buffer allocation may be freed by the user at step 216.

The invention further improves a handheld device's viewing performance by providing a high quality ROI decoding feature, enhanced performance for larger JPEG images and an optimized codec from the usage model standpoint. An image may be subject to a DCT domain low-pass filter, direct down sampling and small size bilinear resizing for a high quality but lower computation large image resizing. This provides a handheld device with higher quality images, while reducing the computation requirements when resizing, zooming and moving images, including larger images.

To achieve this aspect, a JPEG ROI decoding algorithm according to the invention decodes an ROE region in the original image and rescales the ROI of the image into a smaller size. This results in higher quality, lower computation and more accurate ROI decoding. The ROE decoding may be performed by subjecting the image data to a DCT domain low-pass filter. After the filtering, the image data is subject to direct down sampling. Smaller size bilinear resizing may then be applied to the data to create the image.

Figure 3:
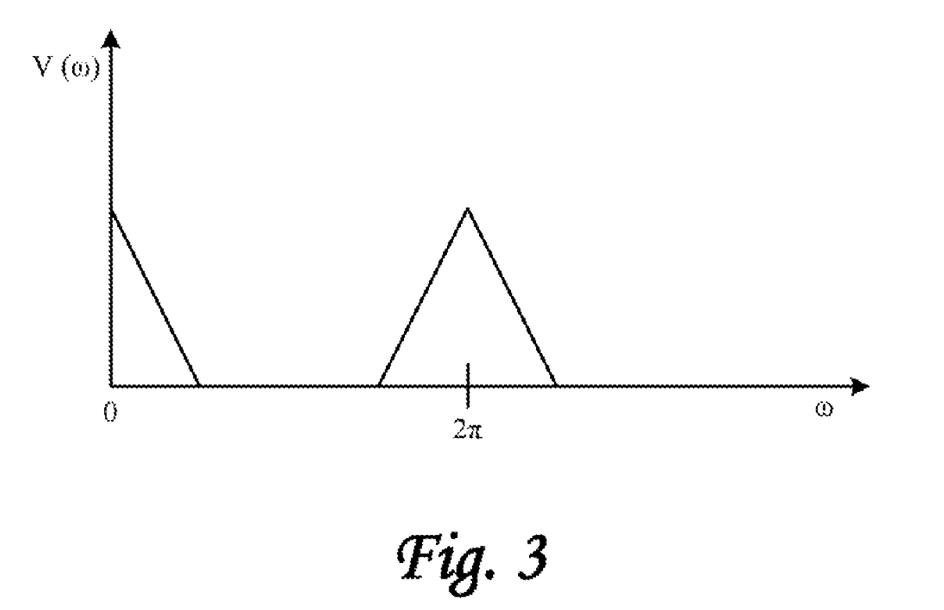
FIG. 3 illustrates a graph of a frequency of a JPEG DCT coefficient.

As described above, the image data may be passed through a low-pass filter. The low-pass filter may be applied first to eliminate frequency aliasing. The JPEG DCT coefficient may serve as the frequency analysis target. FIG. 3 illustrates a graph of a frequency of a JPEG DCT coefficient. A cutting frequency may be calculated from the resizing factor. The low pass filter is applied directly by setting the target DCT coefficient to zero.

Figure 4A:
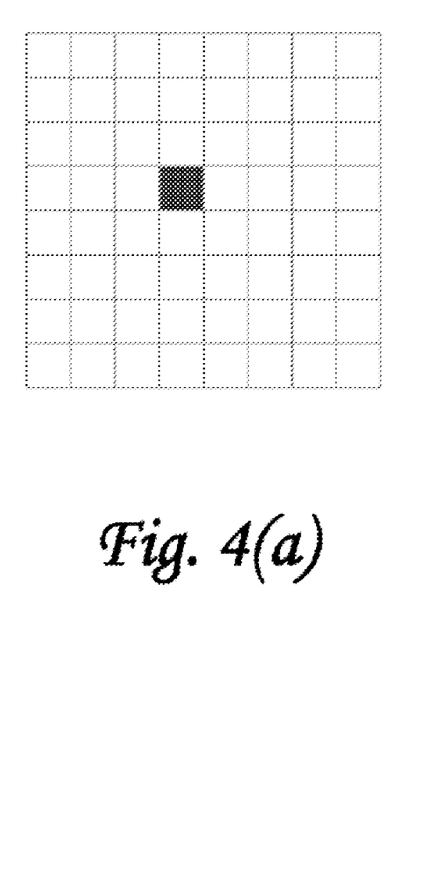
FIGS. 4(A), 4(B) and 4(C) illustrate a method of down sampling an image according to the principles of the invention.
Figure 4B:
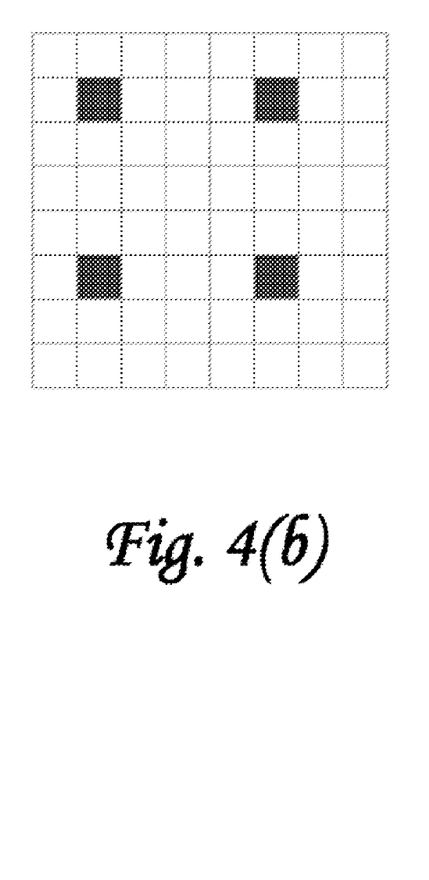
Figure 4C:
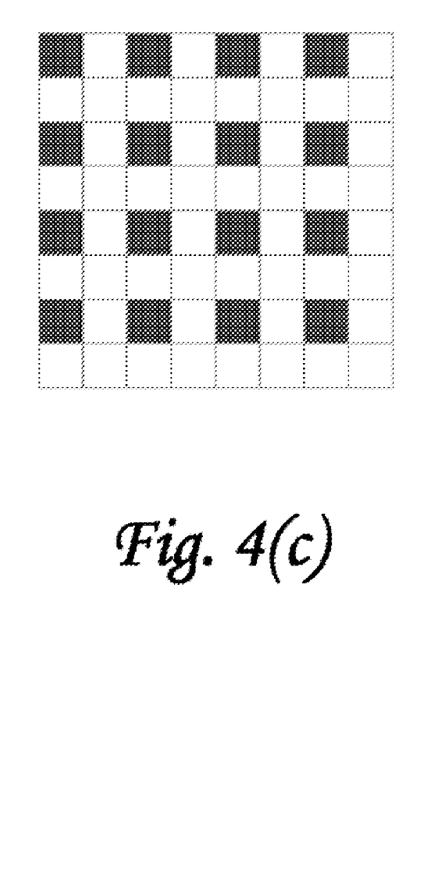
Figure 5A:
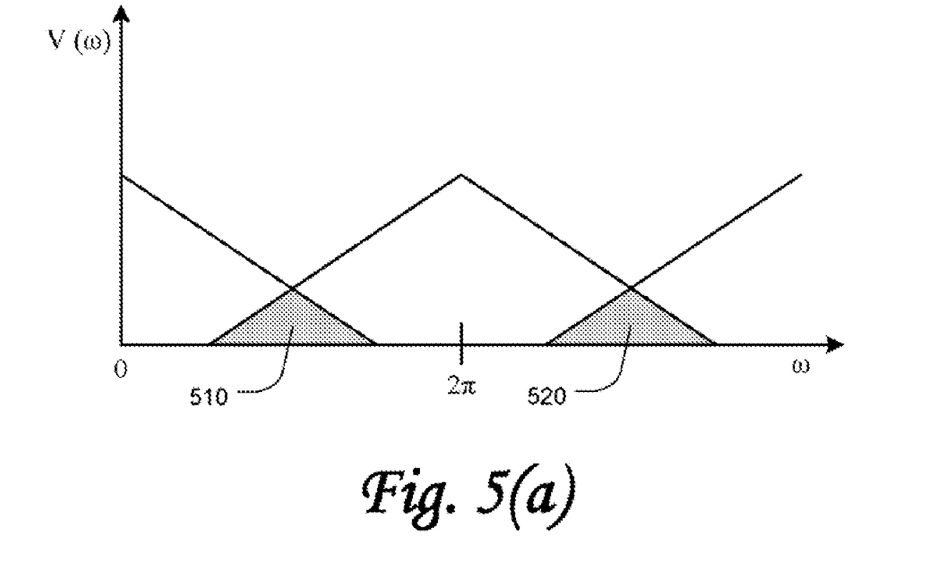
FIG. 5(A) illustrates a graph of a frequency of a JPEG DCT coefficient after down-sampling with no filtering.
Figure 5B:
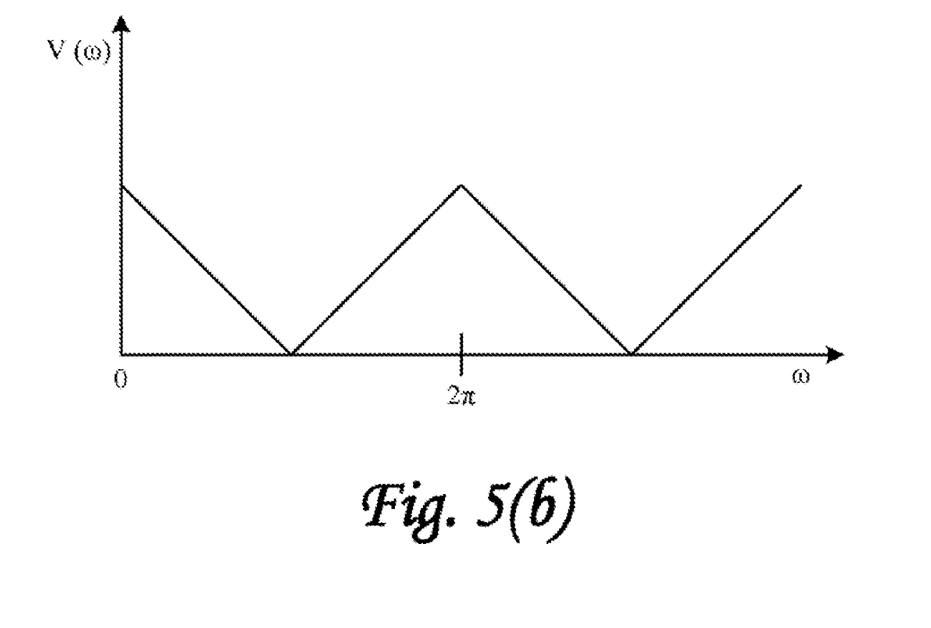
FIG. 5(B) illustrates a graph of a frequency of a JPEG DCT coefficient after down-sampling with filtering, constructed according to the principles of the invention.

Next, a particular down sample approach is discussed. In an embodiment, the direct down sampling may be performed for row and column independently by a factor of $\frac{1}{8}$, $\frac{1}{4}$ and $\frac{1}{2}$, for each MCU tile (such as a 16 pixel by 16 pixel tile) or an 8×8 DCT block according to a row and column resizing factor, as shown in FIGS. 4(A), 4(B) and 4(C), respectively. While the invention uses a direct down sampling technique, it is understood that other down sampling techniques may also be used. FIG. 5(A) illustrates a graph of a frequency of a JPEG DCT coefficient after down-sampling with no filtering. As illustrated, aliasing may occur at regions 510 and 520. FIG. 5(B) illustrates a graph of a frequency of a JPEG DCT coefficient after down sampling with filtering, generated according to the principles of the invention. When filtering is used prior to direct down sampling, aliasing may be reduced or avoided, thereby improving the image displayed.

For each MCU, the direct down sampling may also require a resizing ratio, as the combination of passing the image data through a low pass filter and a direct down sampling may result in a value of half the DCT coefficient. After the direct down sampling, the image size may be one or two times larger in one direction than the ultimate size. Therefore, a bilinear interpolation or the like may be applied to resize the image to the ultimate image size.

Figure 6:
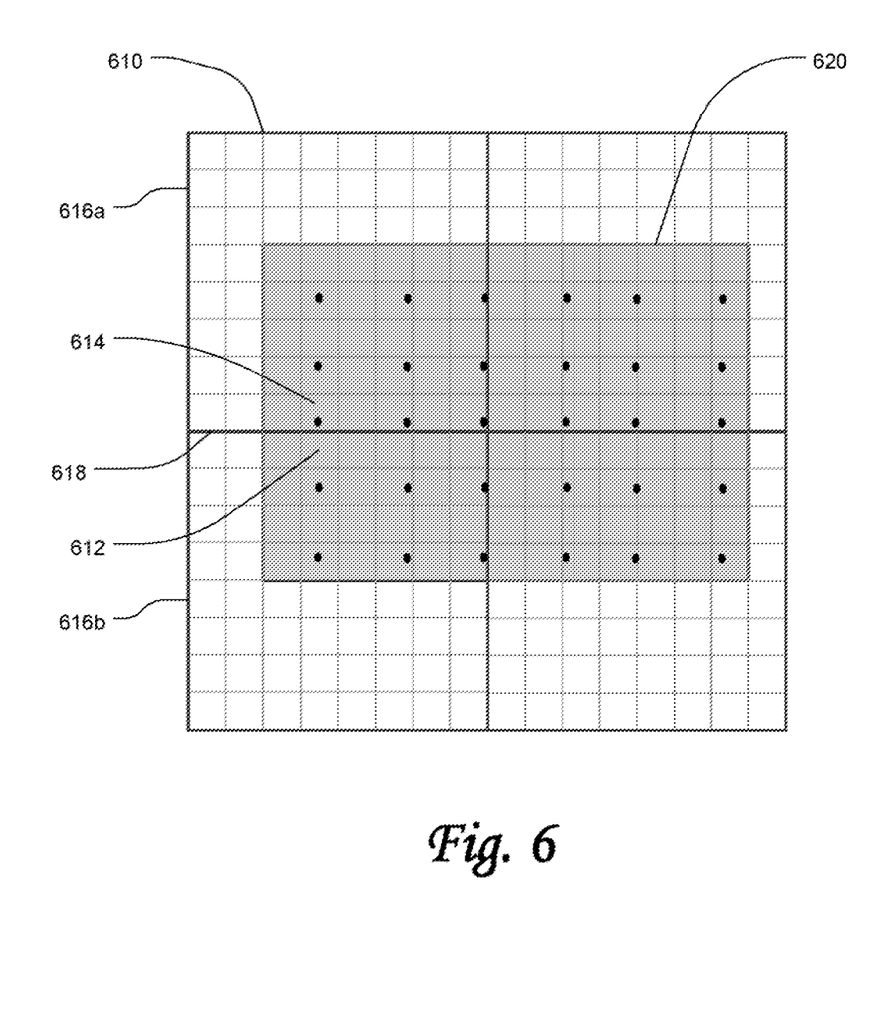
FIG. 6 illustrates a method of avoiding boundary break in padding delta regions of a new ROI, constructed according to the principles of the invention.

According to another embodiment of the invention, it is also desirable to avoid abrupt changes at boundaries of MCU tiles. This may be particularly important when padding or joining adjacent MCU tiles. FIG. 6 illustrates a method of avoiding boundary break in padding delta regions of a new ROI according to the principles of the invention. For each interpolating pixel, such as pixel 612, an x offset and y offset may be the offsets to the nearest source integer pixel position, such as pixel 614. This may be calculated from the original image, not from ROI image. Thus, the boundary interpolation factor may be continuous as the interpolation occurs based on the overall image and may not be hindered by MCU tile boundaries, such as the boundary 618 between MCU tiles 616a and 616b. According to an embodiment of the invention, to support an arbitrary move, a minimum destination ROI region 620 may be 1 pixel by one pixel (1×1) in the proposed ROI decoding method of the invention.

Figure 7:
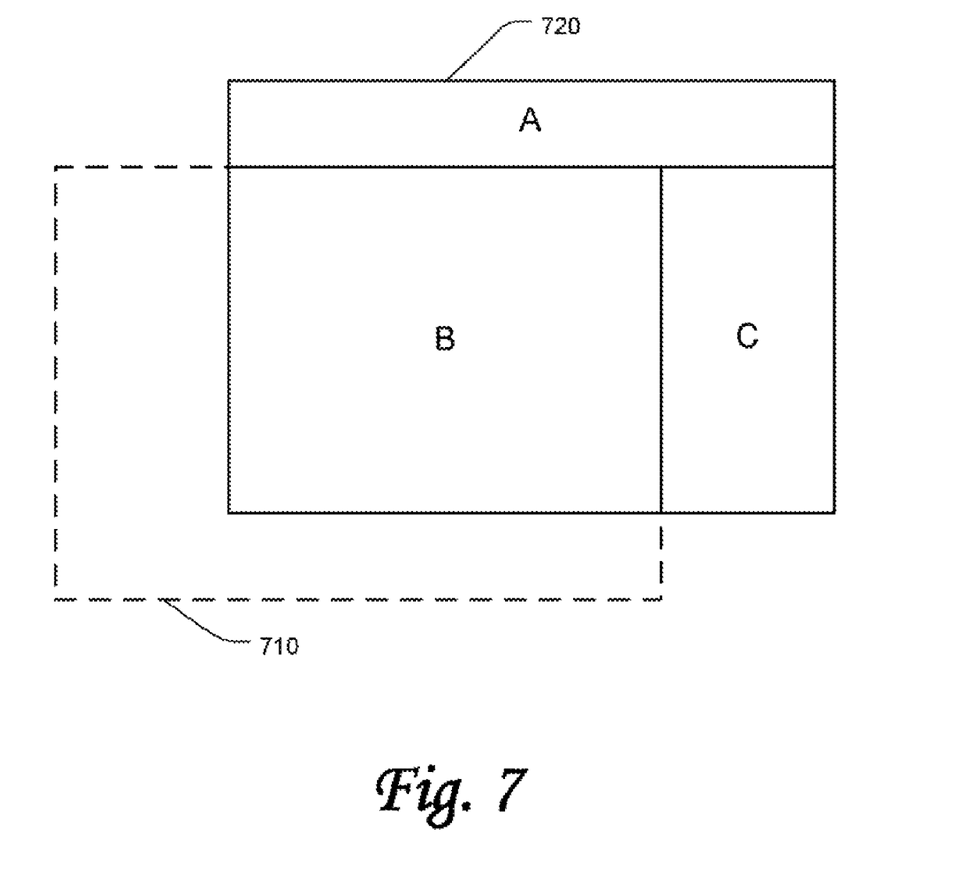
FIG. 7 illustrates a method of adjusting an ROI according to the principles of the invention.

FIG. 7 illustrates how the decoder application adjusts or moves an ROI of an image according to the principles of the invention. An initial ROI 710 for a larger image (not shown) is defined. This ROI may be calculated using principles of the invention based on instructions from a user, such as the selection of an ROI of an image. The user defines a new ROI 720 for an image. In this example, the new ROI 720 partially overlaps with the initial ROI 710. The user may define a new ROI 720 by, for example, manipulating controls of the hand held device to move a portion of the image being displayed. As shown, region B of the new ROI 720 overlaps the initial ROI 710, while regions A and C of the new ROI 720 are new. Therefore, for the new ROI 720, the regions A and B may need to be decoded. The decoded information for the overlapped initial ROI 710 is used along with the decoded information for the regions A and B within the new ROI 720. Regions A and B then are padded or joined together, as discussed above, with the overlapping region C to form the new ROI 720. The invention provides for decoding an ROI and then, upon moving or rotating the image and/or ROI, maintains the information common to both the initial ROI and the new ROI and only processes the new areas. This reduces the processing required when changing the ROI. By reducing processing, a ROI image may be displayed with greater speed and less delay.

Figure 9:
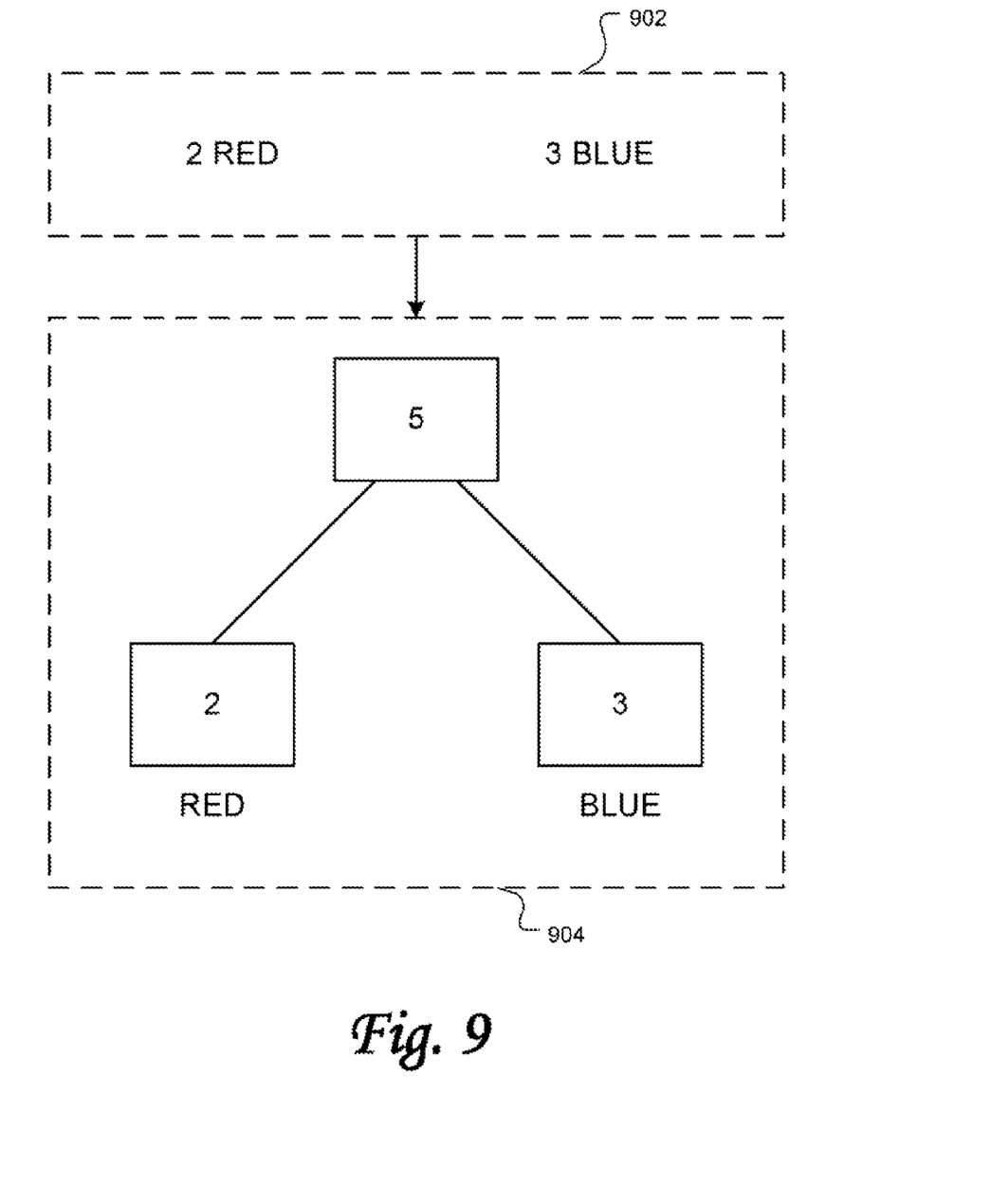
FIG. 9 illustrates Huffman coding according to the invention.

Thus, the invention may further enhance the decoder application's performance for larger JPEG images. This may include optimizing codec usage for displaying the JPEG image. In addition, the invention may provide an improved, more user-friendly interface for the hand held device and ease code maintenance. To achieve this, an internal Huffman index tree may be re-used for ROI decoding, as well as for rotating images and thumbnails. In addition, this Huffman index tree may be used for generating a thumbnail image to optimize the decoder application usage model. Also, the invention may provide a more user-friendly API, as one code base may be needed to be maintained for all these JPEG processing features. The Huffman tree index may use Huffman coding. Huffman coding is an entropy encoding algorithm used for lossless data compression. Huffman coding may use a specific method for choosing the representation for each symbol, resulting in a prefix-free code that may express the most common characters using shorter strings of bits than are used for less common source symbols. A simple example of Huffman coding is shown in FIG. 9 which codes two reds and three blues 902 to generate a Huffman tree 904

According to an embodiment of the invention, the decoder application usage model may perform image rotation only on a full image to speed rotation. Image rotation may be first performed on the decoded raw YUV data. The rotate engine may be called when the user chooses to save the change. For faster zoom and movement of an image, a Huffman tree may be built when a zoom, move or rotate function is to be applied to an image. Future processing, such as when a further zoom, move, or rotate function is called, may be based on the already-built tree thereby improving performance by reducing processing. As described above, only a delta ROI may be decoded during the image move. Three directional moves (i.e., horizontal, vertical and diagonal moves) may be supported during moving an ROI for an image.

Figure 10:
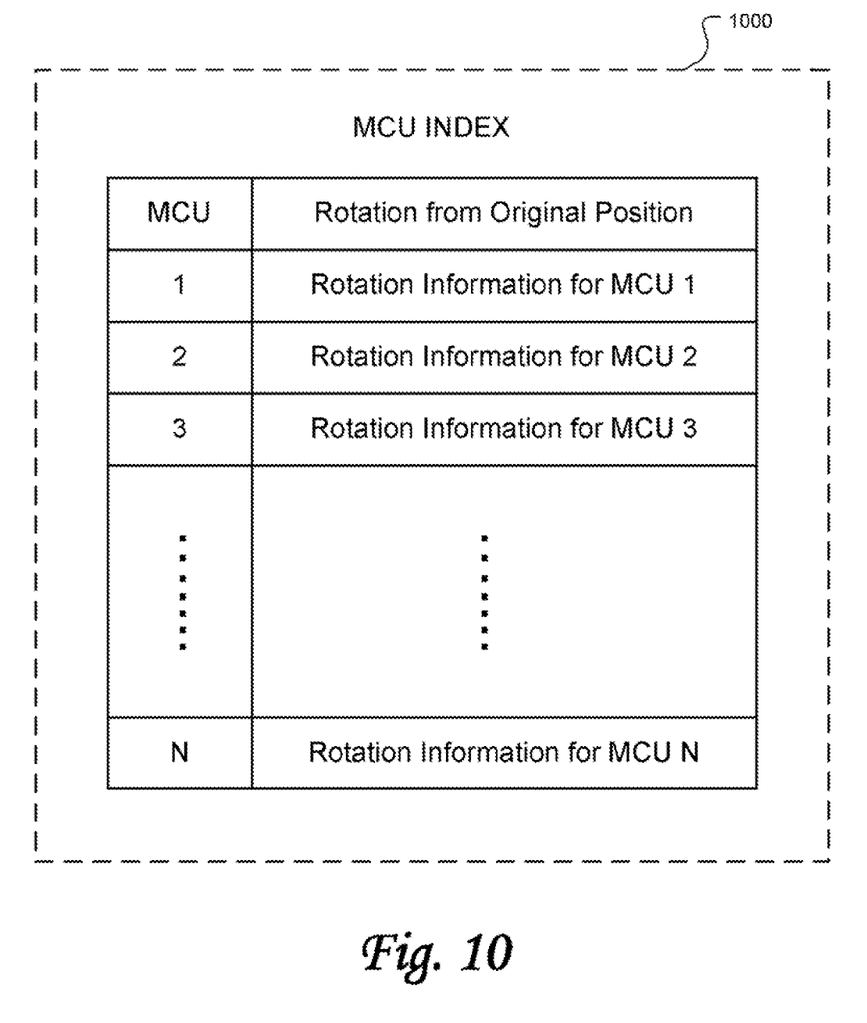
FIG. 10 illustrates a MCU index according to the invention.

When rotating an ROI of a JPEG image according to the invention, the absolute value of a DCT coefficient may remain unchanged after rotation, while the coefficient sign and location may change. The rotation algorithm may be carried out by building the Huffman index tree from the input JPEG stream using known methods. Then, for each destination minimum coding unit (MCU) tile a source MCU index is located according to the rotating pattern. The source MCU index provides information on how each MCU is rotated from its original position. For example, FIG. 10 shows an exemplary MCU index that will associate a particular MCU with the amount of rotation from the original position of that MCU. Thus, the coefficient of each position may be changed, thereby avoiding the need to perform an inverse DCT calculation. The DCT coefficient in an MCU tile may be changed according to a rotating pattern, and written to the destination JPEG stream.

When the source image is rotated, the first pixel column becomes the first in the destination image. When the image is rotated, the Huffman index tree is accessed to obtain the information for the first column. The coefficient is transposed in the first MCU, thereby rotating the image without needing to perform a DCT calculation.

Figure 8A:
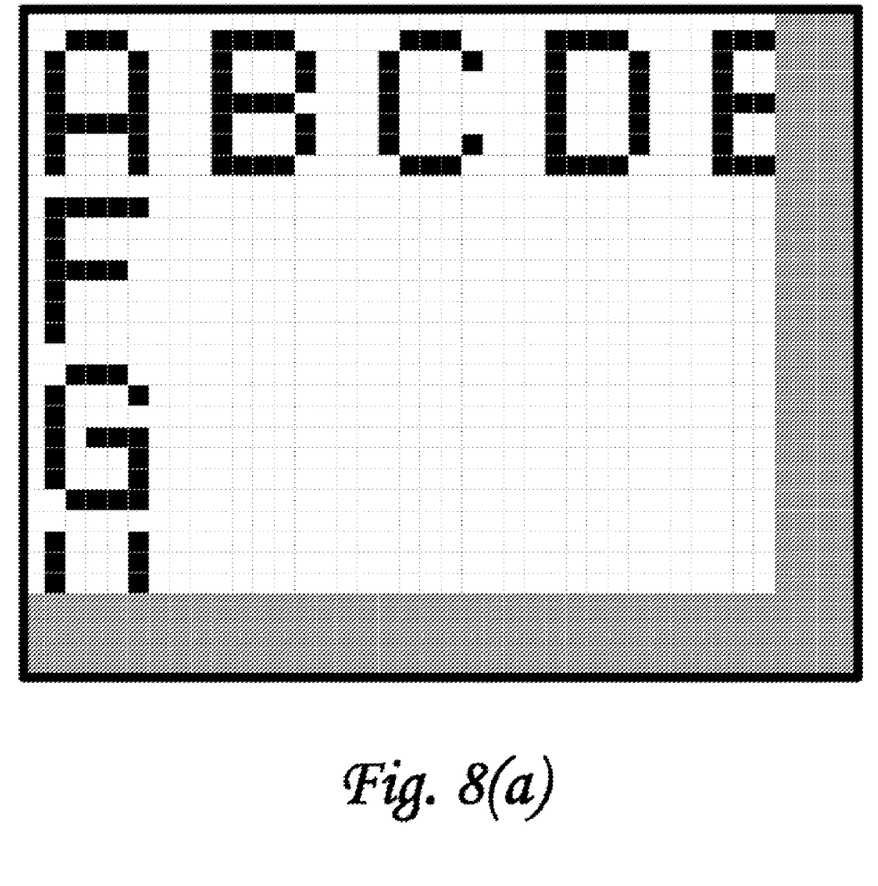
FIGS. 8(A), 8(B) and 8(C) illustrate a method of rotating an ROI according to the principles of the invention.
Figure 8B:
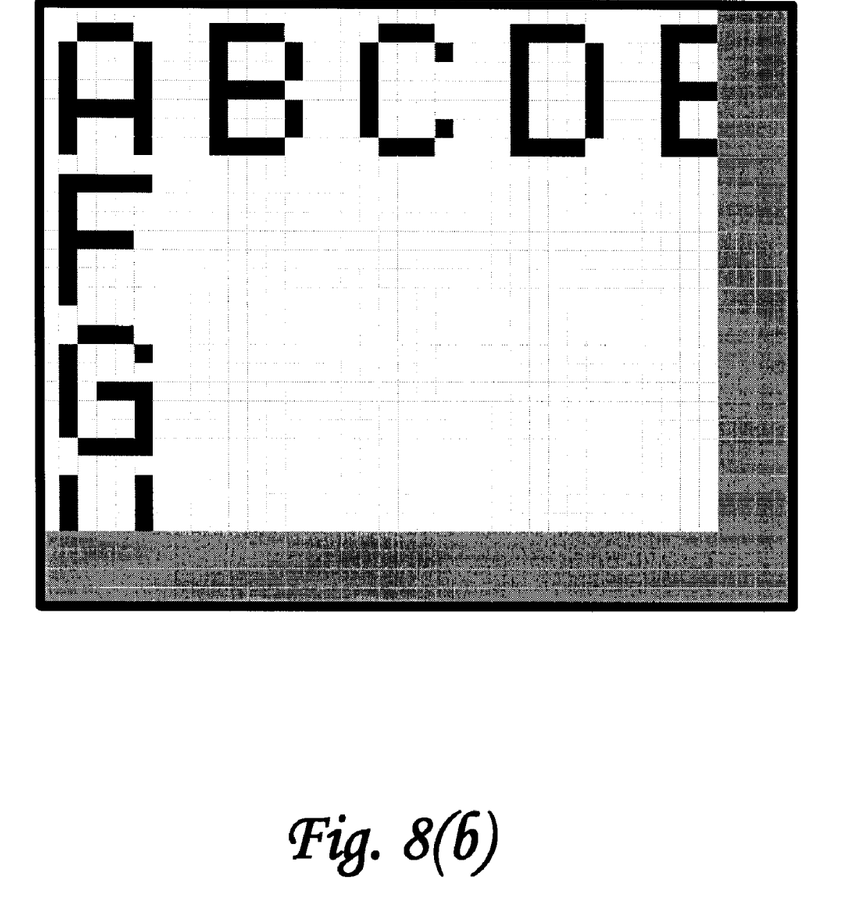
Figure 8C:
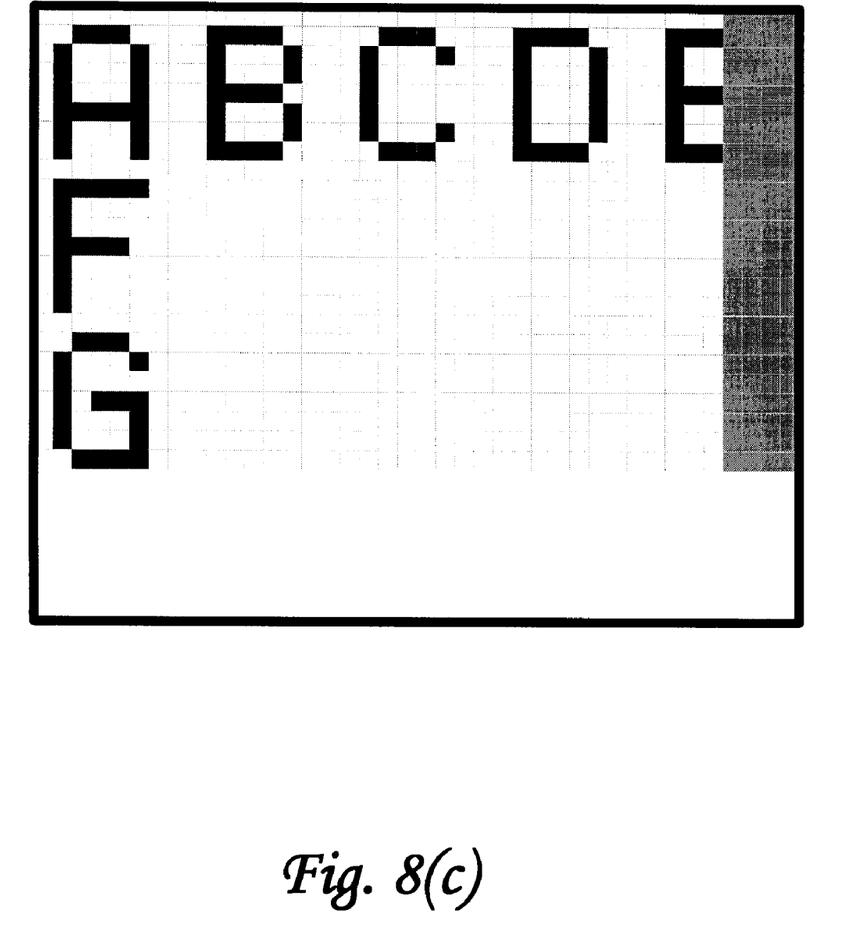

For an image that includes partial MCU tiles i.e. when the image width or height is not aligned to the MCU boundary, it may not be possible to rotate in a lossless manner as the first data in the JPEG image is specified as unused. In such a case, the image may need to be cropped into the MCU boundary. For example, FIGS. 8(A), 8(B), 8(C) illustrate an image in FIG. 8(A) being rotated 90 degrees in the clockwise direction in FIG. 8(B). The age is cropped in FIG. 8(C) to fit the mage to the MCU tile boundary.

The processes described above may also be used in thumbnail image generation for the ROI decoding with some modification. According to the invention, an image with a large number of pixels, e.g., 1,000×1000 pixels, may be processed to create a thumbnail image. The output of the thumbnail image may be YCbCr raw data, and a typical thumbnail image size may be 80×80. In such a situation, only a DC value is needed for each MCU. This DC value is used to form the smaller image, thereby reducing the processing needed. In addition, the resulting DC values may be subject to bilinear resizing to create the thumbnail image from the original image.

Although reference is made to a specific image data protocol, any image data protocol is within the scope of the invention. Moreover, any future enhancement of a current protocol or any future protocol is contemplated for use with the invention.

In accordance with various embodiments of the invention, the methods described herein are intended for operation with dedicated hardware implementations including, but not limited to, semiconductors, application specific integrated circuits, programmable logic arrays, and other hardware devices constructed to implement the methods and modules described herein. Moreover, various embodiments of the invention described herein are intended for operation as software programs running on a computer processor. Furthermore, alternative software implementations including, but not limited to, distributed processing, component/object distributed processing, parallel processing, virtual machine processing, any future enhancements, or any future protocol can also be used to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed is:

1. A method of processing an image, the method comprising:
    receiving selection of a first region of interest (ROI) of an image;
    processing first image data related to the first ROI, wherein said processing first image data includes
        i) applying a low-pass filter to the first image data,
        ii) performing down sampling of the first image data, and
        iii) performing bilinear resizing of the first image data;
    displaying a first image ROI based on the processed first image data;
    receiving selection of a second ROI of the image, the second ROI at least partially overlapping the first ROI;
    processing second image data related to a portion of the second ROI that does not overlap the first ROI;
    combining the processed second image data with the processed first image data that overlaps the second ROI; and
    displaying a second image ROI, based on the combined processed second image data and the processed first image data;
    wherein said applying the low-pass filter further comprises:
        calculating a cutting frequency from a resizing factor of the first image data; and
        setting a target coefficient to zero.

2. The method of claim 1, wherein each of the first image data and the second image data comprises JPEG format data.

3. The method of claim 1, wherein said processing first image data and said processing second image data respectively include decoding the first image data and the second image data.

4. The method of claim 1, wherein the first image data is divided into data blocks, and wherein said down sampling is performed for each data block independently by a factor of ½, ¼ and ⅛.

5. The method of claim 4, wherein the first image data is in JPEG format, and wherein the data blocks comprise a minimum coding unit.

6. The method of claim 1, wherein said performing bilinear resizing comprises performing bilinear interpolation.

7. The method of claim 1, wherein the image is a thumbnail image.

8. The method of claim h further comprising padding a boundary between the first image data and the second image data.

9. A method of processing an image, the method comprising:
    receiving selection of a first region of interest (ROI) of an image;
    processing first image data related to the first ROI;
    displaying a first image ROI based on the processed first image data;
    receiving selection of a second ROI of the image, the second ROI at least partially overlapping the first ROI;
    processing second image data related to a portion of the second ROI that does not overlap the first ROI;
    padding a boundary between the first image data and the second image data, wherein said padding further includes
        calculating a source integer pixel position from the image, and
        determining x offset and y offset based on proximity to a source integer pixel position;
    wherein the source integer pixel position is not changed by boundaries between minimum coding unit tiles;
    combining the processed second image data with the processed first image data that overlaps the second ROI; and
    displaying a second image ROI, based on the combined processed second image data and the processed first image data.

10. A system for processing an image, the system comprising:
    one or more data processors; and
    one or more computer-readable storage mediums encoded with instructions for commanding the one or more data processors to
        receive selection of a first region of interest (ROI) of an image,
        process first image data related to the first ROI, wherein the instructions to process first image data include instructions to
            i) apply a low-pass filter to the first image data,
            ii) perform down sampling of the first image data, and
            iii) perform bilinear resizing of the first image data,
        display a first image ROI based on the processed first image data, receive selection of a second ROI of the image, the second ROI at least partially overlapping the first ROI,
process second image data related to a portion of the second ROI that does not overlap the first ROI,
combine the processed second image data with the processed first image data that overlaps the second ROI, and
display a second image ROI, based on the combined processed second image data and the processed first image data;
wherein the instructions to apply the low-pass filter include instructions to:
calculate a cutting frequency from a resizing factor of the first image data; and
set a target coefficient to zero.

11. One more non-transitory computer-readable storage mediums encoded with instructions for commanding one or more data processors to execute a method of processing an image, the method comprising:
receiving selection of a first region of interest (ROI) of an image;
processing first image data related to the first ROI, wherein said processing first image data includes
i) applying a low-pass filter to the first image data,
ii) performing down sampling of the first image data, and
iii) performing bilinear resizing of the first image data;
displaying a first image ROI based on the processed first image data;
receiving selection of a second ROI of the image, the second ROI at least partially overlapping the first ROI;
processing second image data related to a portion of the second ROI that does not overlap the first ROI;
combining the processed second image data with the processed first image data that overlaps the second ROI; and
displaying a second image ROI, based on the combined processed second image data and the processed first image data;
wherein said applying the low-pass filter further comprises:
calculating a cutting frequency from a resizing factor of the first image data; and
setting a target coefficient to zero.

12. A system for processing an image, the system comprising:
one or more data processors; and
one or more computer-readable storage mediums encoded with instructions for commanding the one or more data processors to
receive selection of a first region of interest (ROI) of an image;
process first image data related to the first ROI;
display a first image ROI based on the first image data;
receive selection of a second ROI of the image, the second ROI at least partially overlapping the first ROI;
process second image data related to a portion of the second ROI that does not overlap the first ROI;
pad a boundary between the first image data and the second image data, wherein the instructions to pad further include instructions to
i) calculate a source integer pixel position from the image, and
ii) determine x offset and y offset based on proximity to a source integer pixel position;
wherein said source integer pixel position is not changed by boundaries between minimum coding unit tiles;
combine the processed second image data with the processed first image data that overlaps the second ROI; and
display a second image ROI, based on the combined processed second image data and the processed first image data.

13. One more non-transitory computer-readable storage mediums encoded with instructions for commanding one or more data processors to execute a method of processing an image, the method comprising:
receiving selection of a first region of interest (ROI) of an image;
processing first image data related to the first ROI;
displaying a first image ROI based on the processed first image data;
receiving selection of a second ROI of the image, the second ROI at least partially overlapping the first ROI;
processing second image data related to a portion of the second ROI that does not overlap the first ROI;
padding a boundary between the first image data and the second image data, wherein said padding further includes
i) calculating a source integer pixel position from the image, and
ii) determining x offset and y offset based on proximity to a source integer pixel position,
wherein said source integer pixel position is not changed by boundaries between minimum coding unit tiles;
combining the processed second image data with the processed first image data that overlaps the second ROI; and
displaying a second image ROI, based on the combined processed second image data and the processed first image data.

* * * * *